US010405690B2

(12) United States Patent
Tentorio

(10) Patent No.: US 10,405,690 B2
(45) Date of Patent: Sep. 10, 2019

(54) SINGLE SERVE BREWING MACHINE

(71) Applicant: Massimo Tentorio, Lecco (IT)

(72) Inventor: Massimo Tentorio, Lecco (IT)

(*) Notice: Subject to any disclaimer, the term of this patent is extended or adjusted under 35 U.S.C. 154(b) by 0 days.

(21) Appl. No.: 15/319,468

(22) PCT Filed: Apr. 21, 2015

(86) PCT No.: PCT/IB2015/052914
§ 371 (c)(1),
(2) Date: Dec. 16, 2016

(87) PCT Pub. No.: WO2015/193744
PCT Pub. Date: Dec. 23, 2015

(65) Prior Publication Data
US 2017/0143157 A1    May 25, 2017

Related U.S. Application Data

(60) Provisional application No. 62/014,550, filed on Jun. 19, 2014.

(51) Int. Cl.
*A47J 31/36* (2006.01)
*A47J 31/40* (2006.01)
*A47J 31/44* (2006.01)

(52) U.S. Cl.
CPC ....... *A47J 31/3638* (2013.01); *A47J 31/3633* (2013.01); *A47J 31/407* (2013.01); *A47J 31/4492* (2013.01)

(58) Field of Classification Search
CPC .. A47J 31/3633; A47J 31/3638; A47J 31/407; A47J 31/4492
See application file for complete search history.

(56) References Cited

U.S. PATENT DOCUMENTS 4,389,925 A * 6/1983 Piana ................. A47J 31/0668
                                                      99/289 R
4,421,014 A * 12/1983 Vicker ................... A47J 31/38
                                                      99/289 P (Continued)

FOREIGN PATENT DOCUMENTS

| EP | 1541070 | 6/2005 |
|---|---|---|
| EP | 2447648 | 5/2012 |
| FR | 2842090 | 1/2004 |

OTHER PUBLICATIONS

PCT International Search Report and Written Opinion for PCT/IB2015/052914 dated Jul. 10, 2015.

*Primary Examiner* — Tu B Hoang
*Assistant Examiner* — Vy T Nguyen
(74) *Attorney, Agent, or Firm* — McCarter & English, LLP

(57) ABSTRACT

According to embodiments described in the specification, a brewing machine has a machine body that includes a plurality of single serve preparation zones. Each single serve preparation zone corresponds to a preparation parameter. The machine body also includes a cartridge acceptor configured to receive a single serve cartridge, a cartridge sorter configured to determine a parameter of the received cartridge and select one of the plurality of single serve preparation zones according to the determined parameter, a transfer sub-assembly configured to transfer the cartridge to the selected single serve preparation zone, and a fluid dispenser for preparing the beverage using the cartridge in the selected single serve preparation zone.

16 Claims, 13 Drawing Sheets

(56) References Cited

U.S. PATENT DOCUMENTS

| | | | | |
|---|---|---|---|---|
| 4,724,752 A * | 2/1988 | Aliesch | A47J 31/3628 | 99/289 R |
| 4,829,889 A * | 5/1989 | Takeuchi | A47J 31/0668 | 99/285 |
| 6,786,134 B2 * | 9/2004 | Green | A47J 31/3633 | 99/289 P |
| 7,013,797 B2 * | 3/2006 | Fischer | A47F 1/085 | 99/287 |
| 7,231,279 B2 * | 6/2007 | Ghidotti | G07F 11/72 | 700/239 |
| 7,389,943 B2 * | 6/2008 | Jaworski | A01M 1/205 | 239/102.2 |
| 7,444,925 B2 * | 11/2008 | Mahlich | A47J 31/3623 | 99/289 P |
| 7,581,658 B2 * | 9/2009 | Mosconi | A47J 31/3623 | 221/156 |
| 7,673,559 B2 * | 3/2010 | Zurcher | A47J 31/3642 | 99/289 R |
| 7,798,055 B2 * | 9/2010 | Mandralis | A47J 31/0673 | 99/284 |
| 9,084,509 B2 * | 7/2015 | Tanner | A47J 31/3695 | |
| 9,384,620 B1 * | 7/2016 | Chang | G07F 11/54 | |
| 9,974,411 B2 * | 5/2018 | Righetti | A47J 31/3642 | |
| 2002/0066798 A1 * | 6/2002 | Laudamiel-Pellet | A01M 1/2033 | 239/34 |
| 2003/0200871 A1 * | 10/2003 | Mangiapane | A47J 31/057 | 99/291 |
| 2005/0223904 A1 * | 10/2005 | Laigneau | A47J 31/0647 | 99/295 |
| 2006/0196364 A1 * | 9/2006 | Kirschner | A47J 31/3623 | 99/295 |
| 2008/0148953 A1 * | 6/2008 | Maldanis | A47J 31/0576 | 99/279 |
| 2008/0250936 A1 * | 10/2008 | Cortese | A47J 31/0668 | 99/295 |
| 2009/0087294 A1 * | 4/2009 | Conti | B65B 5/067 | 414/788.9 |
| 2010/0043211 A1 * | 2/2010 | Pedrazzini | G01N 35/0099 | 29/700 |
| 2011/0041701 A1 * | 2/2011 | Chatterjee | A47J 31/3642 | 99/295 |
| 2011/0110180 A1 * | 5/2011 | Snider | A47J 31/407 | 366/142 |
| 2011/0197771 A1 * | 8/2011 | Bolzicco | A47J 31/0668 | 99/283 |
| 2012/0104025 A1 * | 5/2012 | Anselmino | F25D 23/126 | 99/275 |
| 2012/0295235 A1 * | 11/2012 | Theriault | G09B 19/00 | 434/156 |
| 2014/0102310 A1 * | 4/2014 | Aardenburg | A47J 31/3676 | 99/295 |
| 2014/0312174 A1 * | 10/2014 | Theurich | B64C 23/069 | 244/199.4 |
| 2015/0060481 A1 * | 3/2015 | Murray | B65D 85/8043 | 222/1 |
| 2015/0257580 A1 * | 9/2015 | Crarer | A47J 31/0647 | 426/425 |
| 2016/0176625 A1 * | 6/2016 | Brockman | B65D 85/8043 | 99/295 |

\* cited by examiner

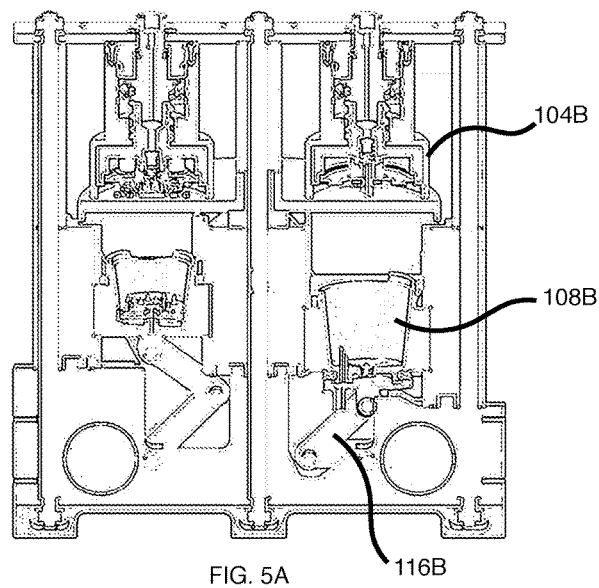
FIG. 5A
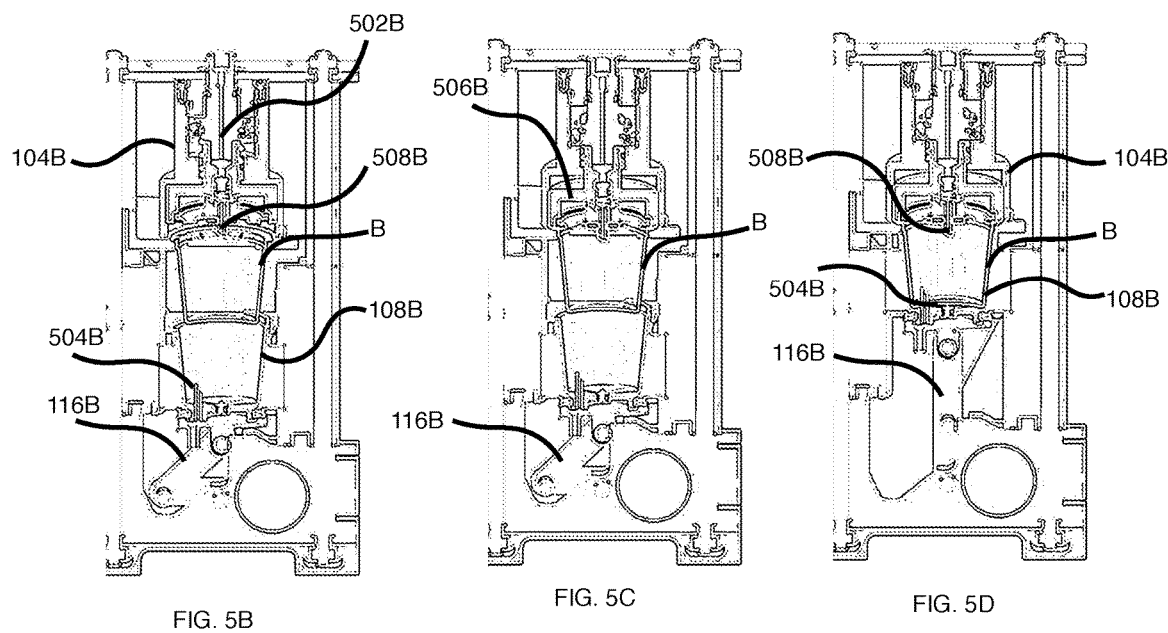
FIG. 5B
FIG. 5C
FIG. 5D

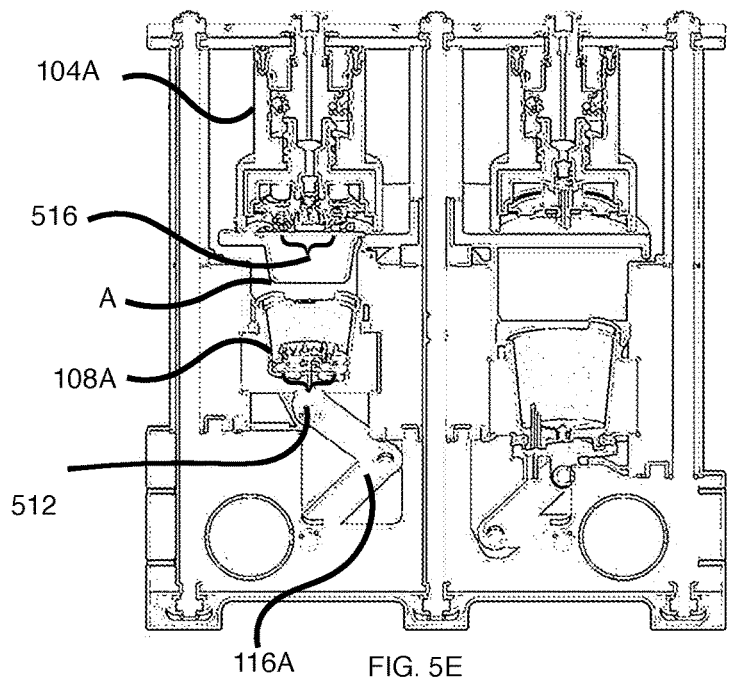
FIG. 5E
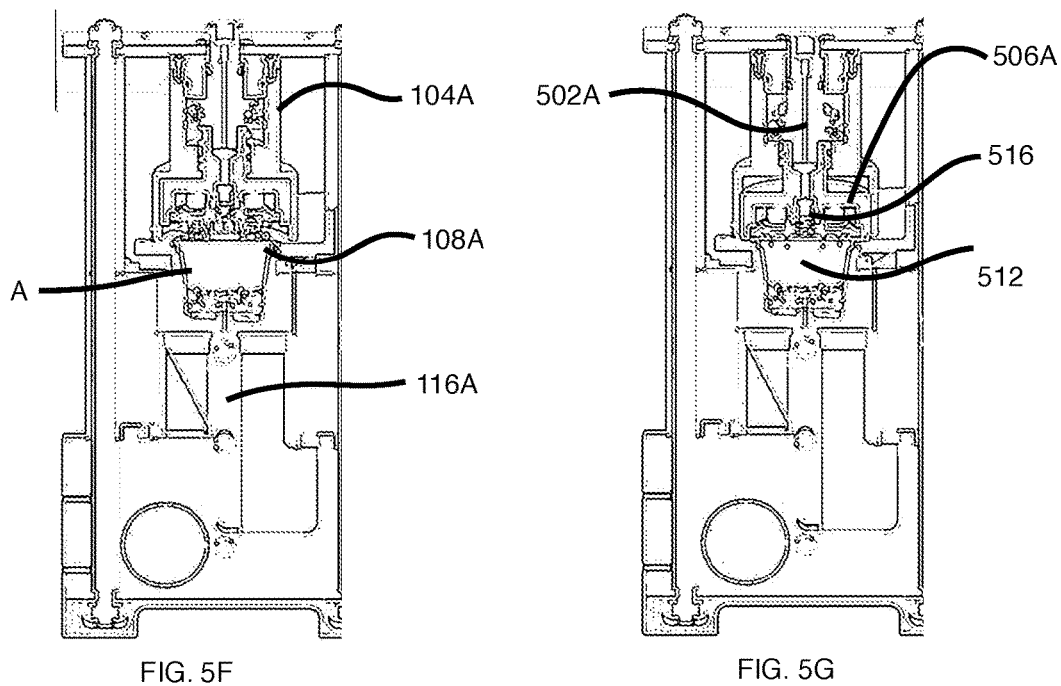
FIG. 5F
FIG. 5G

SINGLE SERVE BREWING MACHINE

FIELD OF TECHNOLOGY

The present disclosure relates to instant foods and, in particular, brewed beverages. Certain embodiments provide a single serve brewing machine.

BACKGROUND

The growth of the single serve coffee and beverage market place is continually increasing, overtaking traditional roast and ground coffee formats. Consumers have adopted the single serve format because it provides good convenience, selection and taste. Today there are two single serve dispensing systems that dominate the market, high water pressure systems for espresso-style coffee, and low pressure water systems for drip-style coffee. Each of these systems provides a different preparation method for coffee.

There has been a multiplication of single serve dispensing systems commercialized under such brands as Keurig™, Nespresso™, Tassimo™, Verismo™, Lavazza™ and Illy™, among numerous others. Such dispensing systems receive individual cartridges (also referred to as cups or capsules or cartridges) that contain a precise measure of coffee grounds or tea leaves for a single beverage serving. As noted above, such systems are typically divided into two categories: dispensing systems that accept cartridges for brewing espresso-style coffee under high water pressure; and dispensing systems that accept cartridges for brewing drip-style coffee or tea under low water pressure. Generally speaking, cartridges for brewing espresso and drip-style coffee are not inter-changeable as they are fabricated to meet different technical requirements and, in any case, typically require cartridges of different sizes, shapes and/or geometries.

At present, to suitably or optimally offer multiple styles of beverages, two separate dispensing systems must be purchased, one for high water pressure (espresso) and one for low water pressure (drip-style). This situation is undesirable in part for one or more of the following reasons:
a) double acquisition costs, b) double the energy use, c) double the counter space consumption and d) double the maintenance.

As suggested above, users must choose between one type of machine and beverage over another, or indeed have multiple systems in their homes or offices. Commercial users, such as airlines or quick serve restaurants, contend with limited space requirements yet their customers can have wide tastes ranging from espresso beverages, such as cappuccinos and lattes, to drip-style coffee or tea beverages. Generally speaking, North American coffee drinkers prefer drip-style coffee beverages (e.g., cup of coffee without crema), while Europeans favor espresso-style beverages. The diversity of regional preferences provides an additional motivation to offer both beverage dispensing systems with a reduced footprint.

For Europe, high pressure is the most widely used system because high water pressure is needed to maximize coffee extraction, which produces the coffee crema (espresso coffee). In contrast, in North America, a low pressure water system is used, which does not produce any coffee crema (drip coffee). Some North American consumers find crema undesirable in their drip-style coffee. In order to produce espresso coffee, a dedicated beverage preparation system is needed. Similarly, in order to produce a low pressure "drip-style" coffee, a dedicated beverage preparation system is needed. Some consumers have accepted that two appliances on the counter top for preparing coffee are needed in order to deliver an authentic beverage and have adopted two machines in their households or workplaces, one for espresso style beverages and one for drip-style beverages.

Various techniques have been developed for providing a brewing system capable of receiving more than one type of cartridge and brewing more than one style of beverage. Past approaches, including those using one or more separate adapters or modules that fit over cartridges having diverse geometries, can suffer from several disadvantages, including inconvenience or misuse if the end user selects an incorrect adapter. As well, the adapters may be detachable or use non-integral components that can be readily damaged or misplaced.

Improvements in brewing systems are desirable, including those for single serve beverage brewing including coffee, tea, and powder-based beverages. For example, there is a need for the design and development of a variable water pressure brewing machine with the capability to brew single serve beverages from cartridges having various parameters, geometries or specifications, and therefore providing consumers with a wider beverage variety, a simpler-to-use interface, at reduced cost and reduced space. Furthermore, there is a need for a beverage system which has the ability to enhance extraction results.

The foregoing examples of the related art and limitations related thereto are intended to be illustrative and not exclusive. Other limitations of the related art will become apparent to those of skill in the art upon a reading of the specification and a review of the drawings.

BRIEF DESCRIPTION OF THE DRAWINGS

Examples are illustrated with reference to the attached drawings. It is intended that the examples and figures disclosed herein be considered illustrative rather than restrictive.

FIG. 5A is a front view, partially cut away, of the brewing machine interior of FIG. 1A, in standby mode;

FIG. 5B is a front view, partially cut away, of the brewing machine interior of FIG. 1A, in a first brewing position;

FIG. 5C is the view of FIG. 5B, with a piston down;

FIG. 5D is the view of FIG. 5B, during infusion;

FIG. 5E is a front view, partially cut away, of the brewing machine interior of FIG. 1A, in a second brewing position;

FIG. 5F is a front view, partially cut away, of the brewing machine interior of FIG. 1A, in a second brewing position with a piston up;

FIG. 5G is the view of FIG. 5F, during infusion;

DETAILED DESCRIPTION

Figure 1A:
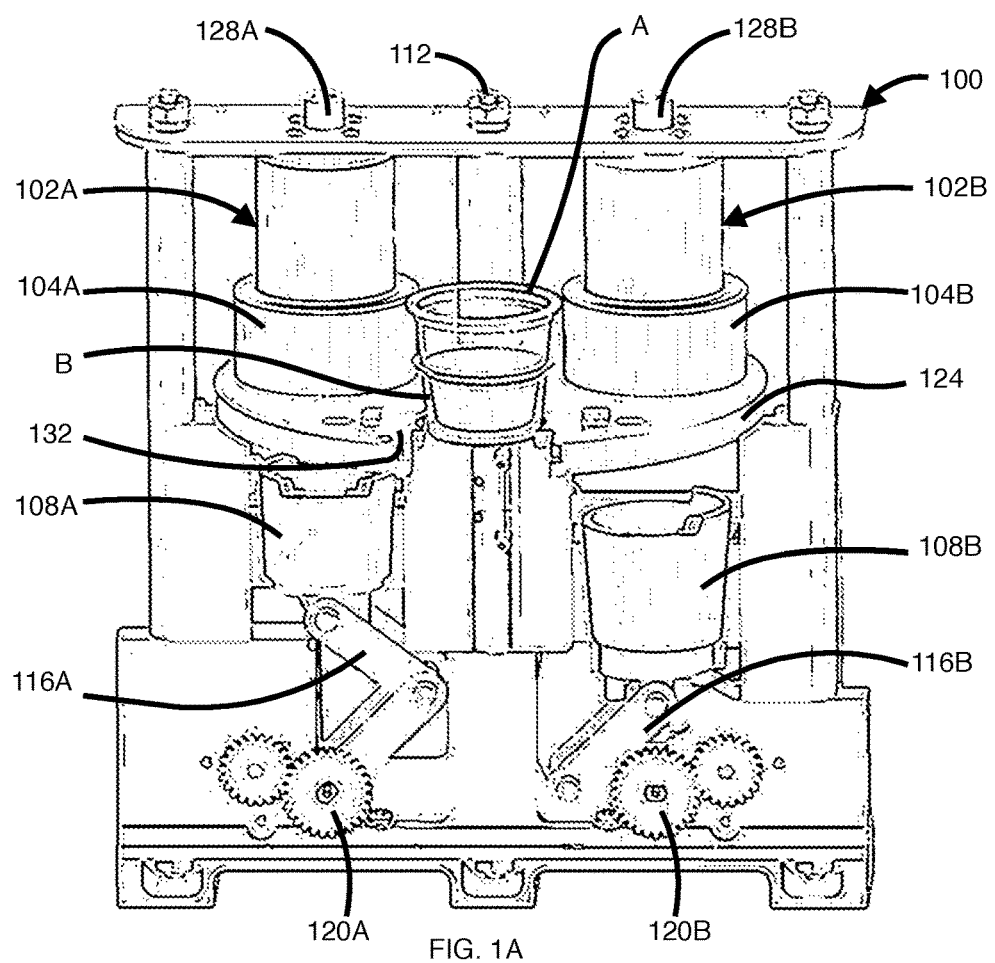
FIG. 1A is a perspective view of a brewing machine interior in accordance with an example.

The following describes a brewing machine having a machine body that includes a plurality of single serve preparation zones. Each single serve preparation zone corresponds to a preparation parameter. The machine body also includes a cartridge acceptor configured to receive a single serve cartridge, a cartridge sorter configured to determine a parameter of the received cartridge and select one of the plurality of single serve preparation zones according to the determined parameter, a transfer sub-assembly configured to transfer the cartridge to the selected single serve preparation zone, and a fluid dispenser for preparing the beverage using the cartridge in the selected single serve preparation zone.

Throughout the following description, specific details are set forth in order to provide a more thorough understanding to persons skilled in the art. However, well-known elements may not be shown or described in detail to avoid unnecessarily obscuring of the disclosure. Accordingly, the description and drawings are to be regarded in an illustrative, rather than a restrictive, sense.

This disclosure relates generally to instant foods, brewed (extracted) beverages and particularly to a single serve brewing systems.

The following description provides a single serve brewing system 100. The brewing machine 100 is capable of accepting espresso-style cartridges (shown as cartridge A in FIG. 1A) and drip-style cartridges (shown as cartridge B in FIG. 1A, sometimes referred to as "K-Cup" format cartridges). Generally, the brewing machine 100 is capable of accepting two or more cartridge geometries.

Each cartridge A and/or cartridge B is typically fashioned to have a frustoconical shape having a lip or shoulder, however all shapes and surface augmentations are intended to be covered within the scope of the present specification. Typically, cartridges for drip-style coffee or tea are larger than cartridges for espresso-style coffee. Although the examples referred to in this specification refer to coffee beverages, it should be apparent that the specification extends to any beverage or food capable of being packaged in a single serve cartridge including coffee, tea, hot chocolate, among other beverages, as well as soups or other instant foods, etc. The present specification is intended to function with any number of varying cartridge shapes, sizes and/or geometries.

The dominant North American "drip-style" cartridge follows the format popularized by Keurig™. The Keurig™ cartridge includes a rigid outer cup or cartridge that is hermetically sealed with a lid at the opening. Within this cartridge, a paper filter is affixed to an interior side wall of the cup so as to form a filter basket for the coffee grounds, creating a two-chamber cartridge as described in U.S. Pat. No. 5,325,765. In the first chamber, coffee grounds intermix with water. The fluid flows through the filter and into the second chamber. It has been observed that a low pressure solution is the only acceptable method to process cartridges having these features. Were high pressure to be used, the paper filter could dislodge from the sidewall (due to poor wet strength), collapsing the two-chamber design and causing coffee grinds to escape into the consumer's cup. Accordingly, skilled readers will appreciate that each unique cartridge geometry or configuration can require its own unique beverage preparation method or process.

In contrast, the technical parameters for making an espresso can be quite specific. For example, the parameters outlined by the Italian Espresso National Institute are shown in the following table:

TABLE 1 sample parameters for making espresso-style beverages

| Element | Parameter |
| --- | --- |
| Portion of ground coffee | 7 ± 0.5 g (0.25 ± 0.02 oz) |
| Exit temperature of water from unit | 88 ± 2° C. (190 ± 4° F.) |
| Temperature in cup | 67 ± 3° C. (153 ± 5° F.) |
| Entry water pressure | 9 ± 1 bar (131 ± 15 psi) |
| Percolation time | 25 seconds ± 5 |
| Volume in cup (including froth) | 25 ± 2.5 mL (0.85 ± 0.08 US fl oz) |

With espresso, hot water under high pressure is forced through a packed layer of precisely ground coffee to extract a thick, flavorful essence in a concentrated form. Crema refers to the emulsified coffee oils, forced out under high pressure (8-10 bars) while making an espresso. These oils do not mix with water and transforms the properties of the coffee in terms of its mouth feel, density, viscosity (thickness), aroma and taste.

Tea brewing depends on such parameters as the quality of the tea leaves, purity of the water, ratio of tea to hot water, correct steeping temperature, correct steeping time, and adequate room for the tea leaves to expand to extract flavor. Tea contains hundreds, if not thousands, of bioactive compounds, including amino acids, caffeine, lignins, proteins, xanthines and flavonoids. The health benefits of tea are most often attributed to tea flavonoids. Tea flavonoids are bioactive compounds that have specific cellular targets that are related to the cardiovascular, chemopreventive, metabolic, neuroprotective and other health benefits. Additional information about the health benefits of tea is found in a Tea Council of the U.S.A., Inc. paper entitled "An Overview of Research on the Potential Health Benefits of Tea", Available at http://www.teausa.com/teausa/images/TeaCouncil-ResearchDocR5_-_FINAL.pdf; and Su X, Duan J, Jiang Y, Duan X, Chen F. Polyphenolic Profile and Antioxidant Activities of Oolong Tea Infusion under Various Steeping Conditions. International Journal of Molecular Sciences. 2007; 8(12):1196-1205. Generally speaking, research suggests that carefully followed stirring and steeping procedures using appropriate time and temperature affect the health benefits that can be obtained from teas. Infusion conditions have effects on antioxidant potentials and sensory assessment.

Below are the temperatures recommended by the Tea Association of the USA for each type of tea:

TABLE 2 sample parameters for making tea beverages

Black tea - 3-5 minutes at 201-210° F. (96.1-98.9° C.)
Darjeeling tea - 3 minutes at 190-195° F. (87.8-90.6° C.)
Oolong tea - 3-5 minutes at 175-195° F. (79.4-90.6° C.)
Chinese green tea - 1-3 minutes at 170-180° F. (76.7-82.2° C.)
Japanese green tea - 1 to 2 minutes at 160-175° F. (71.1-79.4° C.)
White tea - 3 to 4 minutes at about 185° F. (85° C.)

Figure 1B:
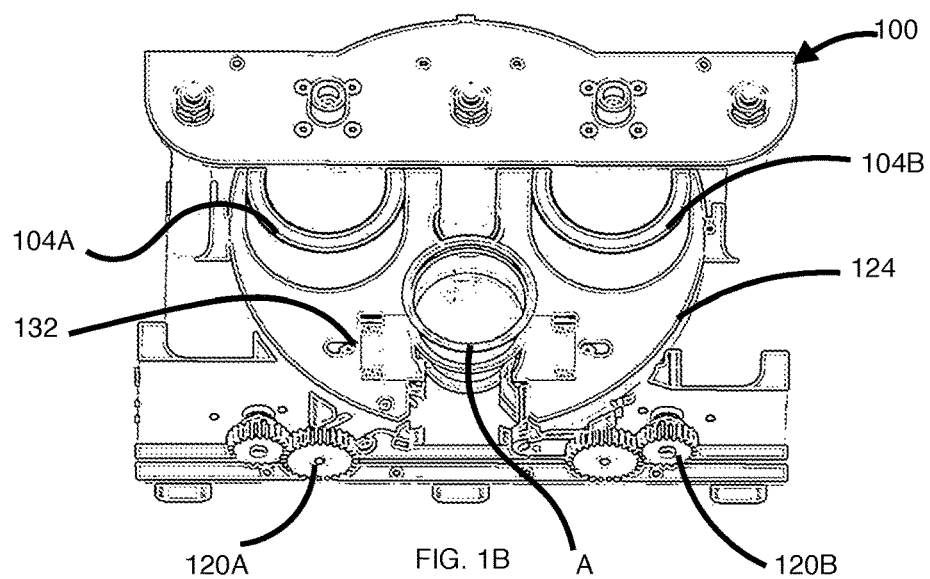
FIG. 1B is a top perspective view of the brewing machine interior of FIG. 1A, with a cartridge shown.
Figure 1C:
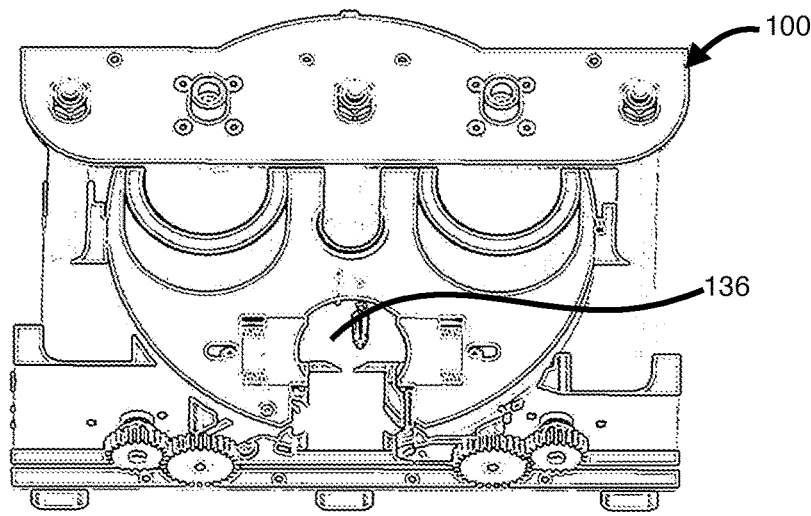
FIG. 1C is the view of FIG. 1B, without a cartridge.

Turning now to FIG. 1A and following, in one example, the brewing machine 100 includes a turn-table 124 (also referred to as a circular cartridge transfer system or transfer sub-assembly). The turn-table 124 includes a location for accepting or receiving both types of cartridge A and cartridge B, shown as a cartridge acceptance opening 136 in FIG. 1C. The location and configuration of the cartridge acceptance opening 136, or chamber, can vary without departing from the scope of the present specification. The cartridge acceptance opening 136 provides a universal loading zone for the receipt of cartridges having various parameters, geometries, sizes, specifications, and the like.

In accordance with an example, the brewing machine 100 includes two or more preparation zones radially located about an axis 112. Each preparation zone can be associated with a housing 102 (sometimes referred to as brewing chamber). According to the example of FIG. 1, two housings 102A and 102B are provided for brewing beverages having two different parameters, namely the geometries of cartridge A and cartridge B, respectively. Each housing 102 can include an upper chamber 104 and a lower chamber 108 for securing the cartridge A or the cartridge B during the brewing cycle, described in more detail below. In operation, water from a source (such as a water tank or plumbed in water connection), is heated and dispensed through the housing 102 or brewing chamber to a user's cup via a dispenser nozzle (not shown).

In an alternative example, multiple types of cartridges can be prepared or brewed in the same preparation zone. According to this example, the brewing machine 100 can be configured to change the pressure of the water passed through the cartridge depending on a parameter of the sensed cartridge, without having to carry the cartridge to a different preparation zone.

In a still further alternative example, the brewing machine 100 can be configured to have multiple acceptance openings 136 and/or dispenser nozzles to accommodate higher throughput needs and/or to reduce cross-contamination (e.g. by providing a single serve tea side and a single serve coffee/espresso side). According to this example (not shown in the drawings), separate motors can drive one or more turn-tables 124 to deliver cartridges among a plurality of preparation zones associated with each acceptance opening 136. The turn-tables 124 can be positioned to share a single ejection zone or to eject spent cartridges in different ejection zones.

Figure 2A:
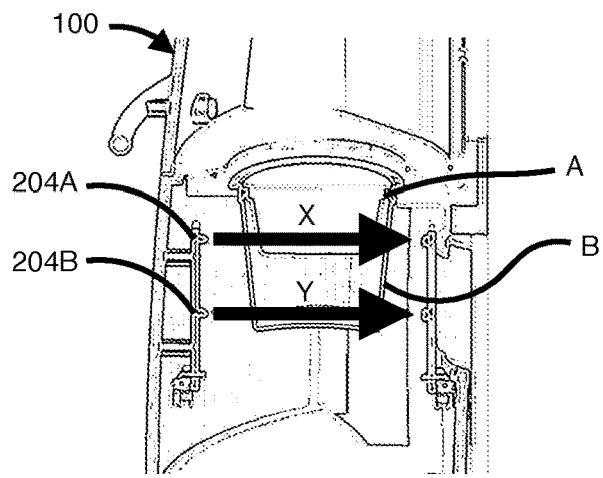
FIG. 2A is an enlarged, cross-sectional view of the brewing machine interior of FIG. 1A.

Once the cartridge is loaded in the cartridge acceptance opening 136, one or more sensors 204 detect the cartridge geometry of the received cartridge A or cartridge B. FIG. 2A provides an example with two light sensors 204A and 204B. A cartridge having the geometry of cartridge A activates (e.g. breaks the path of light of) sensor 204A (given by sensor line X), whereas a (larger) cartridge having the geometry of cartridge B activates both sensors 204A and 204B (given by both sensor line X and sensor line Y). Accordingly, sensors 204 can sense, or detect, the cartridge geometry and provide that information to the brewing machine for selection of the appropriate preparation zone and housing 102.

According to one example, if the consumer inserts a cartridge whose parameter or geometry cannot be identified by the brewing machine 100, the brewing process is bypassed, and the unused cartridge can be transferred directly into the collection hopper 612 (which can also be referred to as a cartridge disposal zone). At the same moment, the display 716 (discussed with reference to FIG. 7) can display an "unauthorized cartridge" or other error message to the user. Advantageously, the unauthorized cartridge is not damaged allowing the user to reclaim the cartridge from the disposal zone and use it in a different brewing machine.

In one alternative example, the sensor 204 can be an optical-to-digital reader. The reader flashes a specific light source on a lid of a received cartridge. The reflective light is sensed by the reader. When a particular or unique light wavelength is recognized, the cartridge and preparation parameters can be sensed.

According to another example, the one or more sensors 204 can include an RFID reader, a bar code scanner, a QR code scanner or a tag scanner to sense a tag or taggant imbedded and/or applied to the cartridge. This sensing can determine the selection of the correct preparation zone, determine the use of a genuine or generic cartridge, and/or set other preparation parameters such as desired pressure or steep time (discussed in more detail below). The present specification is not intended to be limited to height sensors or code scanners; many different types of sensors can be used. In another example, the brewing machine 100 can receive user input representing the user's selection of the cartridge geometry or preparation parameters through button input, mechanical movement (e.g. movement of the turn-table 124), or other user interface input provided on the brewing machine 100 or elsewhere (including use of a display 716 which can be a touch-screen). The user interface can be used in conjunction with the sensors 204 to, for example, select a beverage size (e.g. 6, 8, 12 or 16 ounces or short, long, double espresso, or varying the length of steeping time etc.) for a sensed cartridge. Accordingly, the present specification provides one example technique for cartridge size, shape, or geometry sensing (generically referred to as cartridge geometry sensing). However, the cartridge geometry sensing method can vary according to other techniques that are known in the art.

Figure 2B:
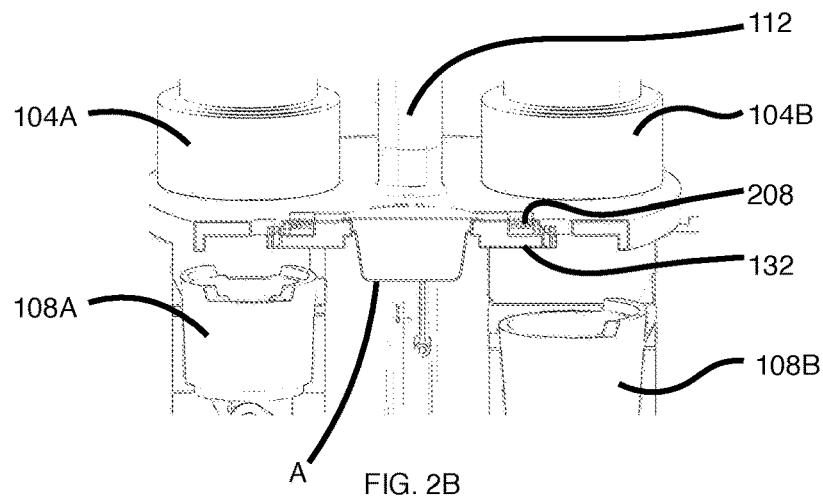
FIG. 2B is an enlarged, perspective view, partially cut away, of the brewing machine interior of FIG. 1A, shown with a drip-style cartridge.
Figure 2C:
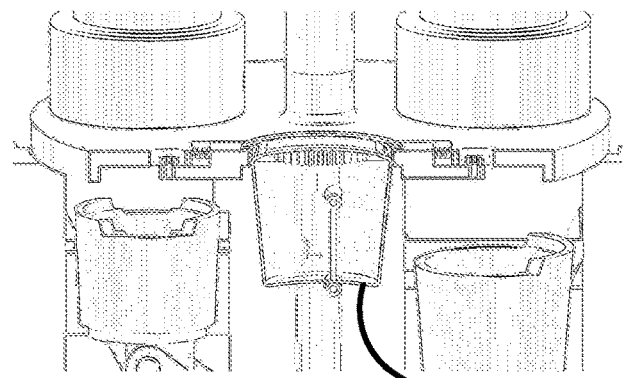
FIG. 2C is an enlarged, perspective view, partially cut away, of the brewing machine interior of FIG. 1A, shown with an espresso-style cartridge.

FIG. 2B provides a view of the brewing machine interior, with an espresso-style cartridge A loaded in the opening 136. One or more spring members 132, tensioned by the springs 208, provide a secure fit of the cartridge A in the cartridge acceptance opening 136 during transport and in the brewing cycle. FIG. 2C provides a view of the brewing machine interior, with a drip-style cartridge B loaded in the opening 136.

Figure 3:
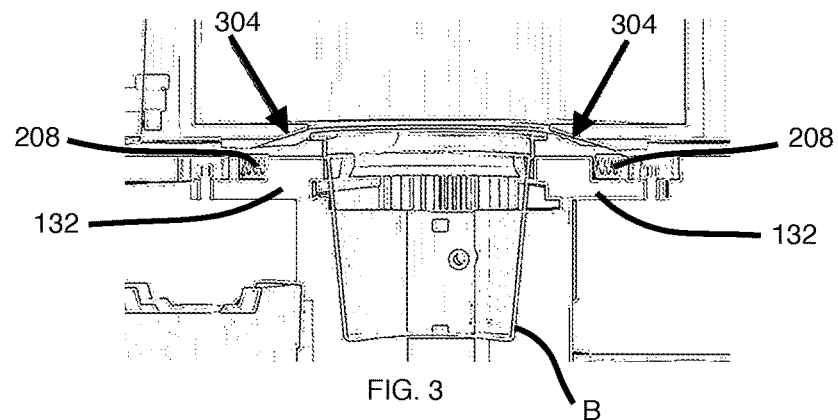
FIG. 3 is an enlarged, front view, partially cut away, of the brewing machine interior of FIG. 1A.

With reference to FIG. 3, alignment guides 304 ensure that the cartridge A or the cartridge B is properly seated before the cartridge is carried into one of the preparation zones. The alignment guides 304 can extend or protrude from the upper chamber 104, can be inclined, and can also be spring loaded so as to adjust and accommodate cartridge dimensions. The alignment guides 304 can thereby move back and forth to determine cartridge geometry by sensing cartridge diameter, in one example. Use of the alignment guides 304 provides universal handling of cartridges ensuring that the brewing machine 100 is capable of receiving cartridges of various shapes and dimensions. The alignment guides 304 can be configured to reject a cartridge if the cartridge's geometry is not compatible with the brewing machine 100.

If a cartridge is not seated properly in the cartridge acceptance opening 136 (e.g., partially tilted), the alignment guides 304 can secure and properly seat the cartridge in the cartridge acceptance opening 136, and thereby ensure the cartridge enters one of the preparation zones in an aligned manner. According to one example, an alignment sensor can ensure the cartridge is seated properly. If the cartridge is not seated properly, then the cartridge can be transferred directly to the ejection zone so as to avoid crushing of the cartridge during the product preparation cycle. Again, the brewing machine 100 can display a fault message on the display 716 advising of the fault.

According to a further example, the turn-table 124 can be driven by a servo motor that is configured to stop accurately during rotation. Instead of sloping guides, a different mechanism of alignment could include a station with a flat surface. When actuated, the flat surface moves downward, applying a slight top pressure on the cartridge ensuring that it is seated in position just before the being transferred to the preparation zone. Many different alignment techniques or approaches are encompassed by the present specification.

Advantageously, the present specification provides for universal handling of cartridges of various sizes and/or geometries permitting the consumer to load or place cartridges of various sizes and/or geometries into a single cartridge acceptance opening 136. The brewing machine 100 can then automatically detect and determine the correct preparation zone and water pressure for brewing the accepted cartridge.

Figure 4:
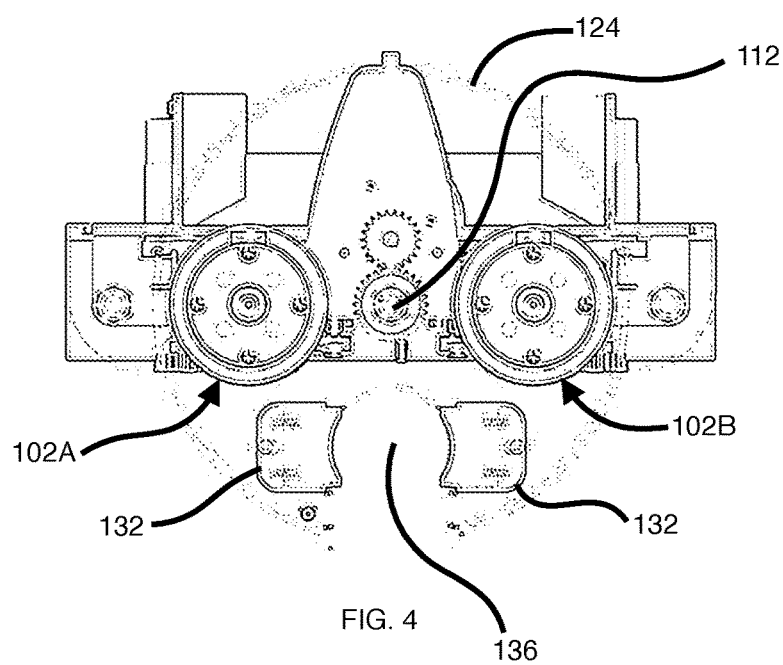
FIG. 4 is a top view of the brewing machine interior of FIG. 1A, in a loading position.

Turning now to FIG. 4, a top view of the brewing machine interior is shown. In operation, the turn-table 124 rotates about an axis 112 according to the selection of the preparation zone. Loaded with cartridge A, the turn-table rotates about the axis 112 in a clock-wise direction. The turn-table 124 thereby is a transfer sub-assembly that transfers the cartridge A to the housing 102A. Alternatively, loaded with cartridge B, the turn-table rotates about the axis 112 in a counter-clockwise direction carrying the cartridge B to the housing 102B. The spring members 132 and/or alignment guides 304 ensure the secure fit of the cartridge in the opening 136 during carrying or transport. Although the example shown is a turn-table 124, many different cartridge transfer sub-assemblies or transport conveying techniques are envisioned within the scope of this specification, including multi-direction (horizontal or vertical) shuttles, sliding arms, and so on.

Figure 7:
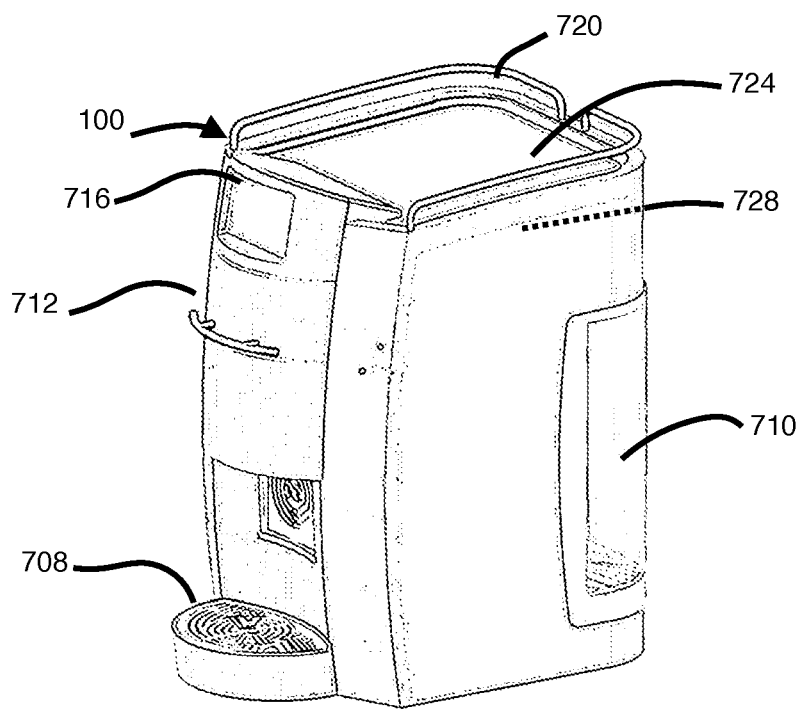
FIG. 7 is a perspective view of the brewing machine according to an example.

In accordance with one example, the brewing machine 100 includes a reservoir or water tank (shown as water tank 710 in FIG. 7). According to alternate examples, the water tank 710 can be detached or omitted in favor of a plumbed-in water connection. According to one example, the user can select a type of water connection to use (plumbed in or water tank) via a switch or other means improving the portability of the brewing machine 100.

FIG. 5A is a front view, partially cut away, of the interior of the brewing machine 100, according to one example. In this view, each of the housings 102 are in standby position, waiting for a cartridge to be accepted.

In FIG. 5B, a cartridge B has been accepted and the turn-table 124 has carried the cartridge B to the location of the housing 102B. In FIG. 5C, a piston 502B moves down, and pins the cartridge B against the edges of the opening 136 with a sealing 506B. In FIG. 5D, an articulating arm 116B moves the lower chamber 108B, closing the housing 102B. The articulating arm 116B can open a fluid exit gate (not referenced in FIG. 5D) and the infusion or brewing process under low water pressure can start.

In operation, cartridge B is seated in the turn-table 124. Once the cartridge B is carried to the selected preparation zone by rotation of the turn-table 124 (in this case, the low water pressure preparation zone), the brewing cycle is started. A sealing 506B of the upper chamber 104B pins down the lip of the cartridge B against the turn-table 124 to prevent up or down movement of the cartridge B ensuring that the cartridge B is secure during brewing. Then, the lower chamber 108B moves up to engage the bottom of the cartridge B. In the example of FIG. 5A and following, the lower chamber 108B is positioned on an articulating arm 116B. The lower chamber 108B includes an ejection needle 504 (also referred to as an ejection member, brew extractor needle or portal) that pierces the bottom of the cartridge B. The ejection needle 504 is a hollow piercing member that moves up vertically and pierces the bottom of the cartridge B, thereby creating an exit channel for the brewed beverage. An injection needle 508 (also referred to as an injection member) moves down to pierce, or puncture, the top or lid of the cartridge B. In one example, the pressure of the water causes the upper chamber 104B (or a component thereof) to move down and pierce or puncture the top or lid of the cartridge B. Once the top or lid of the cartridge B is pierced, the brew cycle commences. Fluid is injected through the cartridge B and the brewed beverage exits through the ejection needle 504 fluidly connected to a flexible tube carried by the articulating arm 116B, in one example. In this example, fluid enters into the housing 102B; the exiting fluid is a beverage.

Turning to FIG. 5E, a cartridge A has been accepted and the turn-table 124 has carried the cartridge to the location of the housing 102A.

In FIG. 5F, the articulating arm 116A moves the lower chamber 108A up. In FIG. 5G, the piston 502A moves down to cause sealing 506A to close the housing 102A on top of the lid of the cartridge A. Accordingly, the cartridge is pinned down before the lower chamber 108B can move up. Upper piercing pins 516 (referred to generically as injection member(s)) open the top or membrane of the cartridge A, while lower piercing pins 512 (referred to generically as ejection member(s)) open the bottom of the cartridge A, and the infusion or brewing process under high water pressure can start. The skilled reader will appreciate that for low pressure beverages, a single injection/ejection member can be used. For high pressure beverages, it is typical to have multiple injection needles in, and multiple extraction needles out.

Figure 5H:
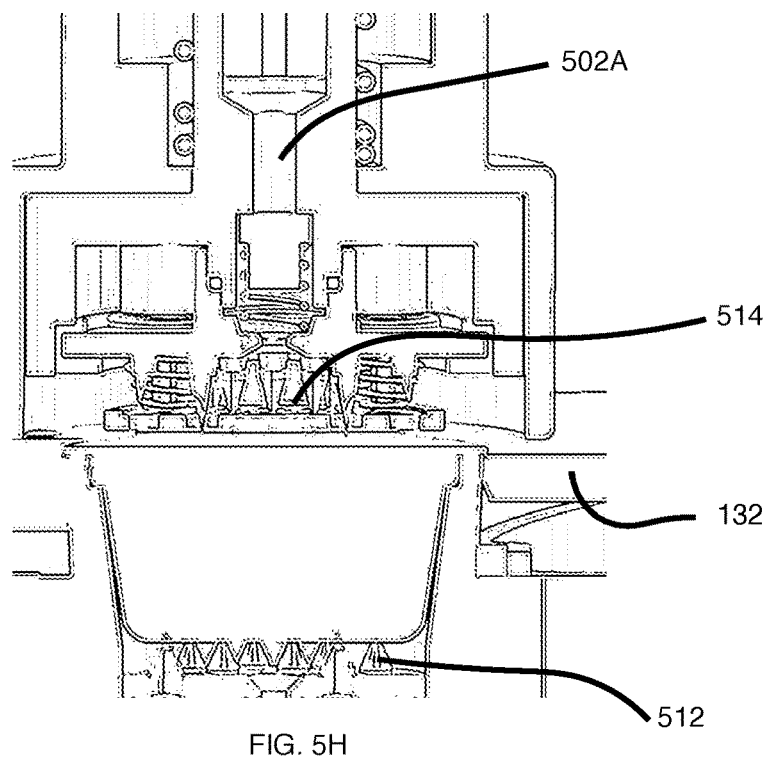
FIG. 5H is an enlarged front view, partially cut away, of the brewing machine interior of FIG. 1A, with a piston shown in a first position.
Figure 5I:
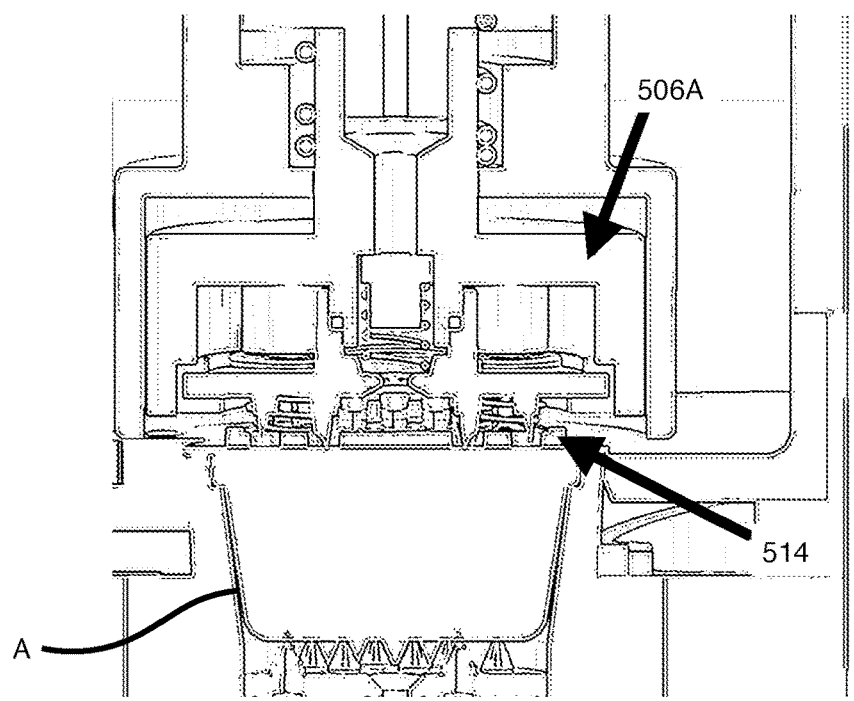
FIG. 5I is the view of FIG. 5H, with the piston shown in a second position.
Figure 5J:
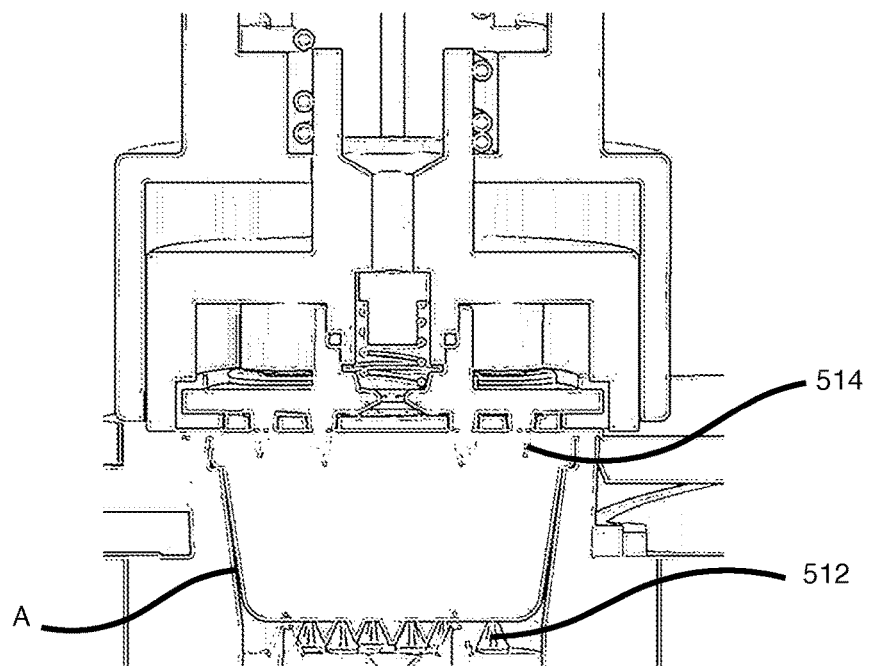
FIG. 5J is the view of FIG. 5H, with the piston shown in a third position.

Now with reference to FIG. 5H, the piston 502A is shown in a first resting position. In FIG. 5I, the piston 502A is shown in a second position, moving the sealing 506A into place and pinning the cartridge A against the turn-table 124. In FIG. 5J, the piston 502A is shown in a third closed position. The upper chamber 104A is completely down, while the lower chamber 108A is completely up, thereby closing the housing 102A and permitting brewing or infusion under high water pressure to be performed. Fluid or steam is injected through the cartridge A and the brewed beverage exits through the ejection member fluidly connected to a flexible tube carried by the articulating arm 116A, in one example. Again, in this example, fluid enters into the housing 102A; the exiting fluid is a beverage.

After brewing, and upon release of the water pressure, the upper chamber 104 (or a component thereof) relaxes. The articulating arm 116 moves into rest position, which moves the lower chamber 108 away from the cartridge A or the cartridge B. However, the cartridge remains pinned to the upper chamber 104 (or the sealing 506). According to one example, pinning of the lip of cartridge is important to ensure that the cartridge remains fixed during the withdrawal of the ejection needle 504 (or piercing pins 516, generically referred to as extraction piercing member) and ensures that the spent cartridge remains seated properly in the turn-table 124, ready for ejection.

Accordingly, the methods disclosed herein according to one example provide the steps of pinning a lip of the cartridge, piercing a first location (e.g. top) of the cartridge, closing a housing and piercing a second location (e.g. bottom) upon closing of the housing. After extraction of the brewed beverage, the reverse happens: the housing is disengaged, the first piercing member retracts, then the cartridge is un-pinned. In one example, each preparation zone can have separate ejection and injection members or an injection/ejection arrangement. Advantageously, the present specification provides a cartridge piercing method with improved extraction efficiency and/or quality in a reduced footprint.

Current approaches to single serve brewing solutions typically involve a brewing machine and a cartridge. These solutions require that the consumer insert the cartridge into a cartridge receiving chamber of the brewing machine. Typically, the cartridge receiving chamber has both water injection needle or needles (required for piercing lid) and extraction needle (required for piercing base). Both needles are rigidly fixed to the receiving chamber and are mechanically linked together so as to function as one coupled system. When the consumer uses the handle to close the chamber, both the injection needle or needles and extraction needle pierce and penetrate the cartridge at the same time. During infusion, a continuous fluid path is formed (meaning water will make its way into cartridge and will flow out of the cartridge in a continuous fashion).

Providing a channel with a continuous fluid path means that there is limited contact time of the fluid with the extractable or soluble matter, resulting in poor and/or inefficient extraction/solubility. Some prior single serve dispensing solutions attempt to address this problem through intermittent water infusion (spraying) to "prepare" or "pre-wet" the extractable matter for better extraction. The "spray" approach can be problematical: it may not completely cover/surround the total extractable matter hence leaving the product improperly prepared for complete extraction. Due to this shortcoming, product developers may also add more product than necessary to cartridges so as to provide sufficient product surface area available during the brew/extraction cycles.

Furthermore, when employing the use of powder products within a cartridge, contact time and submersion time ensures full product solubility and avoiding and/or minimizing the residue in cartridge, in the brewing machine, and in the consumer's cup.

As mentioned above, different tea types (green, black, etc.) require different steeping times (leaves fully immersed in water) due to unique absorption and extraction requirements. When dried, whole leaf teas shrink and/or take-up minimum space, however, when immersed in water, the dry leaves absorb water and grow in size by in some cases a factor of ×5 or greater. Whole leaf tea leaves should be packed loosely to provide sufficient space during the extraction process and minimize leaf damage. In single serve format (K-Cup style), tea products perform poorly and are expensive vs. traditional tea bags. Traditional tea bags, because of longer extraction times utilize significant less tea (e.g. about 1.5 to about 3 grams per tea bag, cartridge solutions are at least double, if not about 3× or more) and can be used to make multiple servings and because there is a longer steeping time product tastes significant better relative to a cartridge solution. Generally speaking, tea cartridge have not been successful because of the above noted shortcomings.

The use of paper filters can further impede the quality of extraction process. Paper is highly hydrophilic (meaning it promotes fluid conductivity) and hygroscopic (meaning it absorbs water about 6× its own weight). Current single serve brewing cartridges that include a paper (cellulose based filters) filter absorb a partial amount of the extracted material, resulting in a beverage that is light and thin.

Figure 10A:
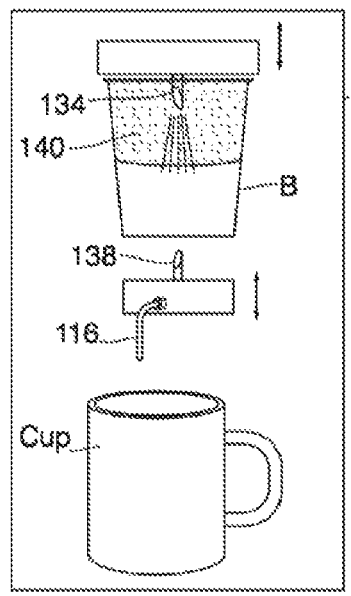
FIG. 10A-FIG. 10B are schematic views of a brewing machine, in operation according to an example.

Now with reference to FIG. 10A, according to one example of the present specification, in part to overcome these and other shortcomings, the brewing machine 100 can be configured to produce a concentrate within the cartridge, which is particularly suitable for some coffee or tea beverages. According to this technique, the brewing machine 100 has the ability to flood the interior portion of a cartridge A or a cartridge B containing ingredients 140 (sometimes referred to as steeping, deep steeping, or holding a steep for several seconds or more) prior to the ejection piercing taking place and completion of brewing according to the techniques disclosed above. Thus it will be appreciated that steeping within a cartridge refers to soaking cartridge ingredients within the cartridge (i.e., a small cup) and optionally decaying the resulting concentrate into the user's cup (i.e., a larger cup). Immersing or inter-mixing cartridge ingredients in water and holding in this "bathing" state for an extended period of time can result in super-saturation of cartridge ingredients and improved extraction and/or full solubility (latter is for powders). Steeping generally refers to the soaking in liquid (usually water) of a solid so as to extract flavors or to soften the solid. Some teas are prepared for drinking by steeping the leaves in heated water to release the flavor and nutrients. Herbal teas may be prepared by decoction, infusion, or maceration.

Current solutions that cause injection and ejection piercing of cartridges at the same time do not generally permit fluid to accumulate or to be held within the cartridge. According to these solutions, the extraction cycle is not efficient, requiring product developers to add more product content to compensate. According to the steep techniques disclosed in the present specification, product developers can lower the product content and achieve better extraction, an improved beverage and lower cost. Using less product content causes less food waste, and provides an improved environmental footprint.

Thus, it can be seen that the brewing machine 100 according to disclosed examples can de-couple the piercing function of the injection member 134 from the ejection member 138 so as to have a multi-step brewing cycle.

Figure 10B:
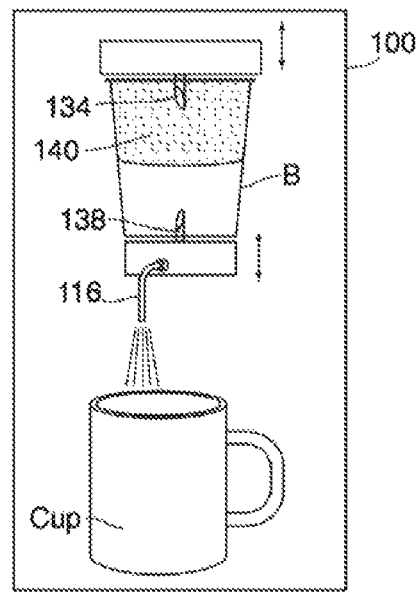

According to one example, as shown in FIG. 10A, injection piercing of the cartridge can be activated via directing high pressure water from a centralized water system of the brewing machine 100 so as to activate a downward motion of the upper piercing member (i.e. activating the piston). Once the injection member 134 is in its fully engaged position (eventually piercing the top or membrane of the cartridge A or cartridge B), the injection member 134 can be held in this position until control means 126 (not shown) of the brewing machine 100 releases this operation. The ejection member 138 can be selectively moved (e.g. raised) only when initiated by the control means 126, after a time period as shown in FIG. 10B. In one example, the control means 126 include a servo motor drive. Advantageously, use of a servo motor drive yields fine control and gentle piercing action that may be required for some materials. As well, the two stage piercing system allows the brewing machine 100 to perform a "steep" function, as outlined in more detail below.

Figure 11A:
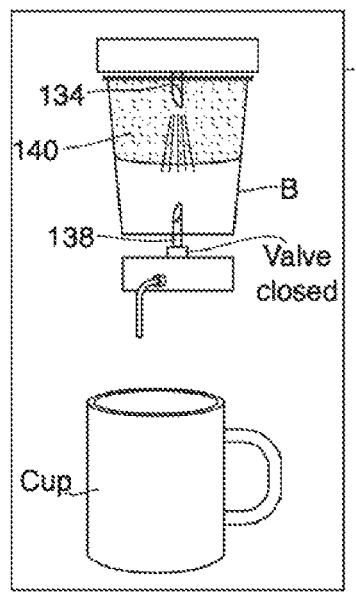
FIG. 11A-FIG. 11B are schematic views of a brewing machine, in operation according to an alternative example.
Figure 11B:
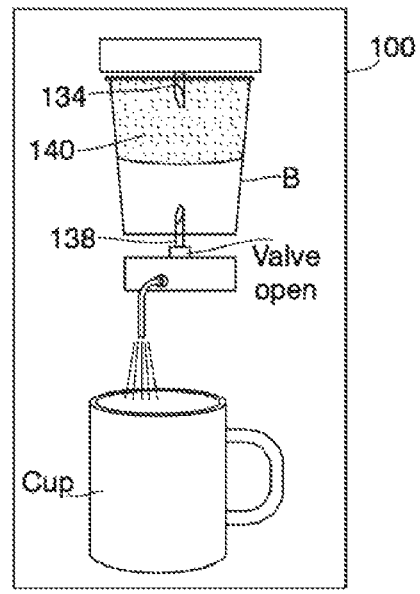

According to an alternative example illustrated in FIG. 11A, injection and ejection piercing can occur at the same time, but a valve can prevent the fluid from being ejected until after a specified delay or event. For example, after a time period has passed, then the valve can be opened, via the control means 126 or other electronic or mechanical means, as shown in FIG. 11B. The valve can be configured to close again, to permit multiple cycles of steeping to occur, or in one example can be used in combination with the process described with reference to FIG. 10A and FIG. 10B.

An example follows: Step 1—the injection member 134 (such as injection needle 508) pierces the lid of the cartridge, and injects a specific amount of water which will nearly fill the cartridge (but not exceed the volume of the cartridge), leaving the ingredients fully immersed in water (i.e., charging the cartridge, this will be the partial amount of water required to make the complete beverage) (e.g., 1.5 oz of an 8 oz beverage); Step 2—The charged cartridge undergoes a holding time of >1 second, specific time will depend on the sensed cartridge or user input; Step 3—After the holding time has been reached, the ejection member 138 (such as ejection needle 508) pierces the bottom of the cartridge, allow the charge liquid (i.e., 1.5 oz concentrate) to exit the cartridge; and Step 4—After the concentrate has exited the cartridge, the balance of the brew cycle 6.5 oz of water can flow through the cartridge fluid delivery path. Now that the ingredients 140 have be optimally prepared for extraction in Step 1 & Step 2, the balance of the brew cycle can now extract the balance ingredients of the for making the beverage. The beverage is then dispensed through dispenser 116.

A variation to the above steps in Step #2 adds an air percolation cycle while the cartridge is charged. The slow insertion of air can help agitate the ingredients improving extraction and/or solubility. Another variation in Step #4 injects the water at a slower rate so as to further extract more out of the ingredients.

The cartridge can be configured to have a headspace (i.e., product free area), to permit expansion of the ingredients (e.g. tea). If there is insufficient space for product expansion, the injection member 134 can get blocked causing back pressure and/or water leakage during pre-infusion or brewing. Prior solutions dealing with espresso cartridge headspace require that product be tightly packed, however this approach leaves limited space for tea extraction and/or creates an inferior environment for total ingredient submersion. Therefore, it has been discovered that good conditions for extraction indicate a cartridge with about 5% or more free headspace, depending on product expansion needs. Accordingly, the desired headspace for most teas would be in the range 10-20%, however a range of 20 to 50% or more headspace can be expected depending on product characteristics.

Examples of steep techniques can be configured to work for cartridges with or without paper filters.

A touch-based interface of the brewing machine 100 can be provided to customize one or more settings, such as the steep setting, offering "craft-like" beverage experience. As noted above, teas require different steeping times. The steep can be customized upon receipt of user input at a touch-sensitive display (e.g. "Green Tea", "Oolong Tea", etc.), or via a taggant or other code read by the brewing machine 100.

The steep techniques can be applied to powder-based beverages. Current solutions that pierce upper and lower portions of the cartridges at the same time make it difficult to fully dissolve powders. According to the steep techniques disclosed herein, powders can sit in water for an extended time improving the solubility of the resulting beverage.

It has been discovered that seven (7) seconds of steeping produces acceptable results for green tea, however short or longer holding times may be require for other beverage types. For example, a soup cartridge may require 20 seconds so as to ensure solubility of the dry powders. The steep function allows water to fully contact the extractable content contained within the cartridge (coffee grounds, tea leaves) so as to optimize the brew cycle. In one example, the steep can be held for five (5) seconds or longer. Other times or ranges are intended to be included within the scope of the present specification.

Moreover, according to one example, the brewing machine 100 can be configured to perform a "clean brew" function. According to this example, the brewing machine 100 can be configured to perform a flush cycle after each brewing, providing less flavor transfer and cross-contamination. In this example, after a spent cartridge is ejected (discussed in more detail below), the turn-table 124 can rotate back to the housing 102 (i.e., the brewing location). Upon the closing of the upper chamber 104 and the lower chamber 108, a final brew cycle takes place, flushing the housing 102 and leaving the housing 102 clean for the next product. Once this cycle is done, the turn-table 124 rotates back into home position ending the brew cycle. In one example, all water cycles end up in the cup or a waste container (shown as 914 in FIG. 9). Optionally, an air purge can be used during the final flush of the housing 102 to ensure a more robust cleaning of the brewing machine 100.

For example, the brewing machine 100 can be configured to perform the following functions in sequence, for an 8 oz hot chocolate (cocoa-based product): Stage One: Steep (2 oz water); Stage Two: Pierce and Partial Brew (6 oz water); and Stage Three: Clean Brew (2 oz water).

Figure 6A:
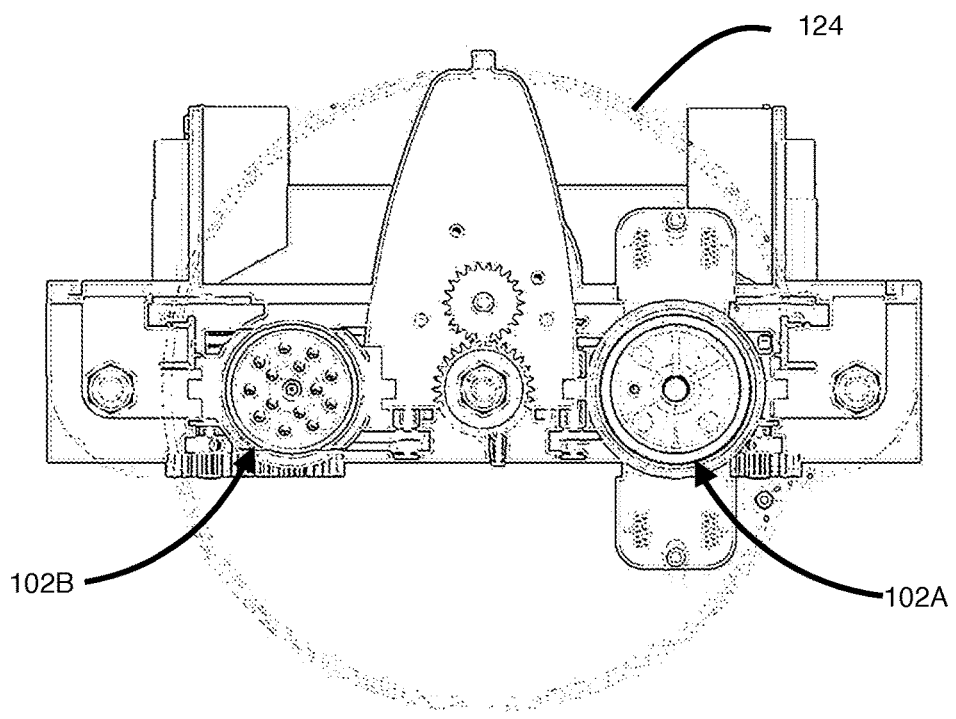
FIG. 6A is a top view of the brewing machine interior of FIG. 1A, in a brewing position.

FIG. 6A is a top view of the interior of the brewing machine 100 in a brewing position. Once the brewing cycle has completed, the turn-table 124 can rotate to carry (or otherwise transport) the spent cartridge B, for example, to an ejection zone. In one example, the brewing machine 100 includes a single ejection zone; however, multiple ejection zones are contemplated within the scope of the present specification.

Figure 6B:
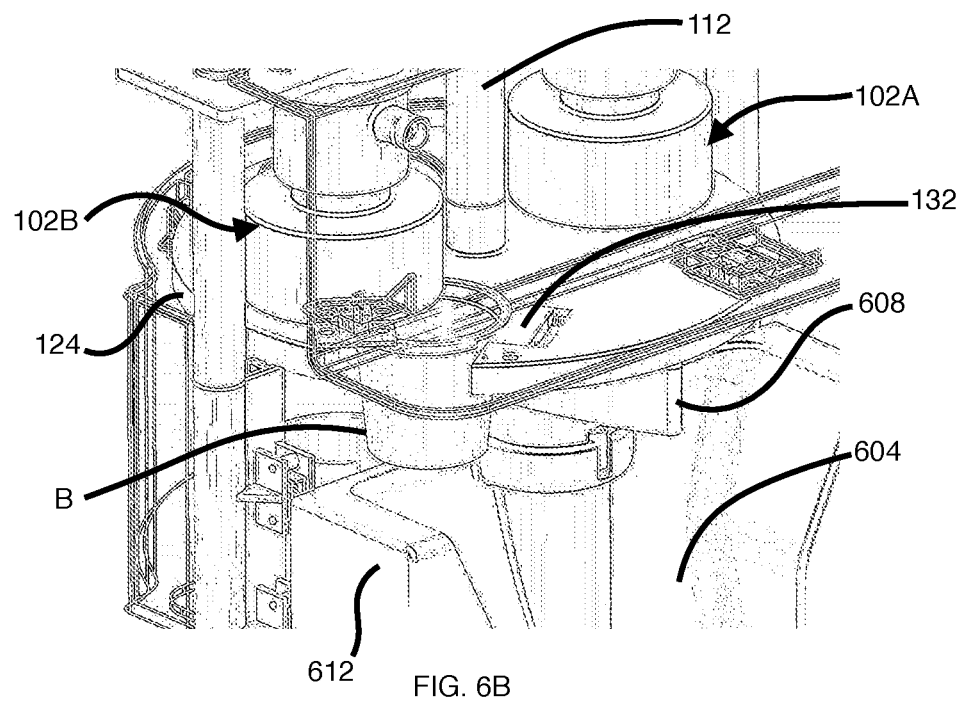
FIG. 6B is a rear perspective view of the brewing machine interior of FIG. 1A, in a first ejection position.
Figure 6C:
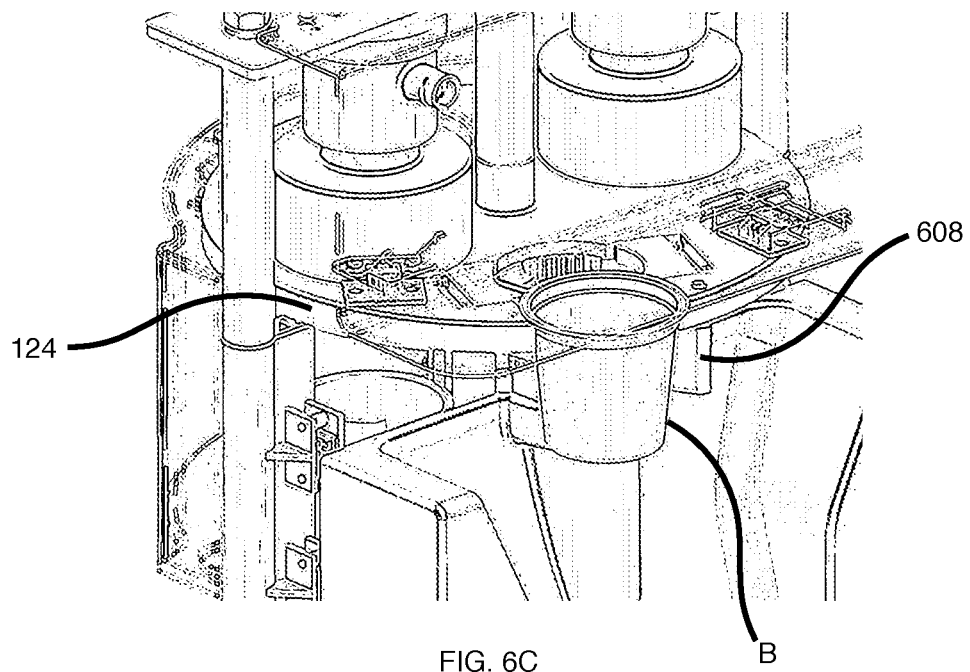
FIG. 6C is the view of FIG. 6B, in a second ejection position.
Figure 6D:
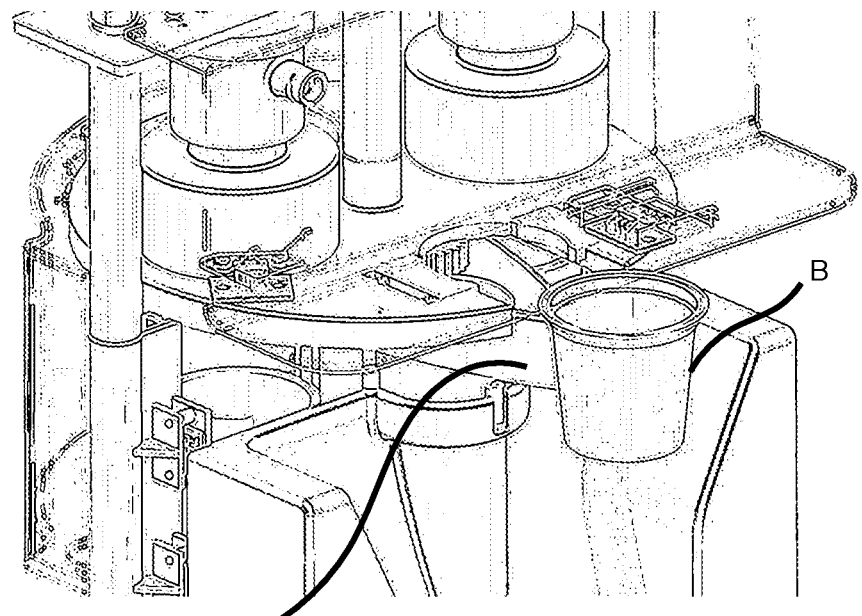
FIG. 6D is the view of FIG. 6B, in a third ejection position.

FIG. 6B illustrates the rotation of the turn-table 124 carrying the spent cartridge B to an ejection zone. The ejection zone can include a collection hopper 612 and collection hopper interior 604. In this example, turn-table 124 engages with cam 608 on a cam path causing the eventual displacement of the cartridge B from the opening 136. FIG. 6C and FIG. 6D shows further rotation of the turn-table 124 along the cam path causing the spent cartridge to fall into the collection hopper 612 (detachment of the cartridge is not shown).

According to one example, the collection hopper 612 can be detached or omitted. In this configuration, an opening or exit chute 614 is positioned at the bottom of the brewing machine 100 permitting spent cartridge to fall out of the brewing machine 100 (e.g. into a waste bin). When the brewing machine 100 is positioned on a counter, and the waste bin is placed under the counter, spent cartridges can fall through a counter hole directly into the waste bin.

According to other examples, the organic material contained within the spent cartridge can be extracted before or after ejection and can be collected in a separate collection hopper. The top or lid of the cartridge B may be cut to facilitate the extraction. The spent cartridges may be crushed or otherwise reduced in size before ejection. According to one example, a sensor 616 (not shown) may sense, or detect, if the spent cartridge collection hopper 612 is full and cause error handling procedures to be engaged (such as a warning or other message to the user). Advantageously, the brewing machine 100 can provide for the automatic ejection of the spent cartridge after the brewing cycle is completed, saving the user from having to handle a cartridge that has come into contact with hot fluids.

In one example, each preparation zone can use separate dispenser paths to avoid flavor transfer and cross-contamination. Each of the following styles of beverage can have a separate preparation zone: espresso, coffee, tea, soup, and so on. While the present specification has described one method of beverage preparation depending on such variables as cartridge size and/or desired water pressure, it will be apparent that many methods of preparation of the beverage are intended to be included within the scope of the present specification.

FIG. 7 is a perspective view of the brewing machine 100 according to one example. The brewing machine 100 can include a display 716, a drawer handle 712, a drip tray 708, a water tank 710, one or more heaters 728 (e.g. boiler, thermoblock, thermocoil, etc.), a top surface 724 which can be made of stainless steel, and a side wall 720. The heater 728 can be a boiler that is positioned proximate, or near, the top surface 724 to warm serving cups stored on top of the brewing machine 100. The shape or functions of the brewing machine 100 can vary, without departing from the scope of the present specification. The present specification provides a reduced space, single serve brewing machine design, with multi-variable water pressure capabilities. According to one example, the display 716 is a touch-screen display that permits customized product preparation. The brewing machine 100 can include computer hardware comprising a processor, data storage, and a network interface device and can be configured to communicate with user devices such as tablets, laptops, desktops, smart phones, smart watches, smart home devices, wearables, and the like. Communication protocols can include USB, BlueTooth, wired or wireless networking, and the like. In one example, the brewing machine can include a USB port permitting the user to update the brewing machine software/firmware and to gain access to user data or analytics.

Figure 8:
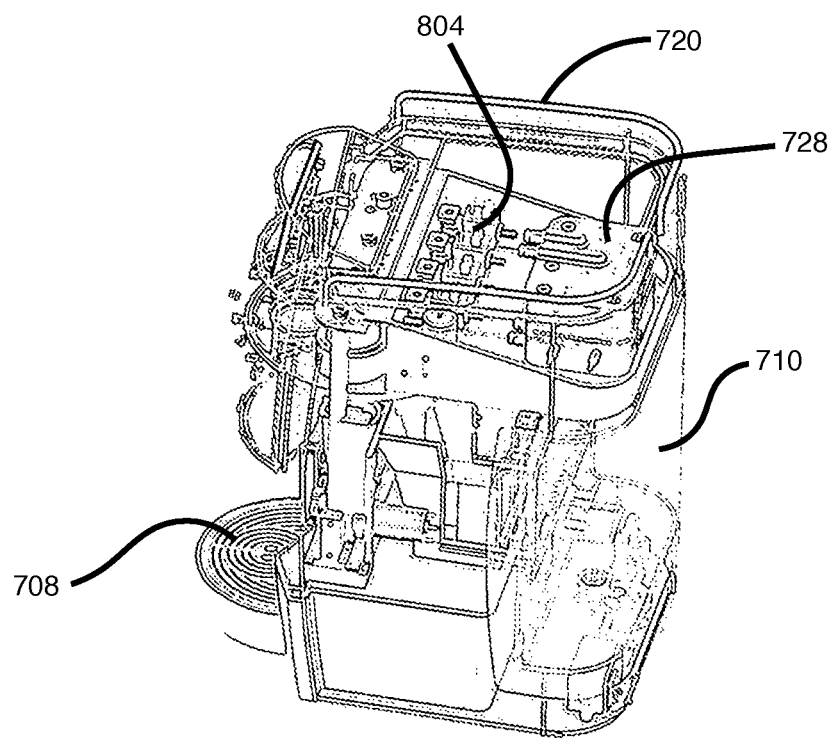
FIG. 8 is a side perspective view, partially cut away, of the brewing machine of FIG. 7.

FIG. 8 is a side perspective view of the brewing machine 100, showing internal components. The boiler 728 is illustrated, as well as a plurality of electro-valves 804 that carry the water for use during the brewing cycle. The configuration of these components can be varied without departing from the scope of the present specification.

Figure 9:
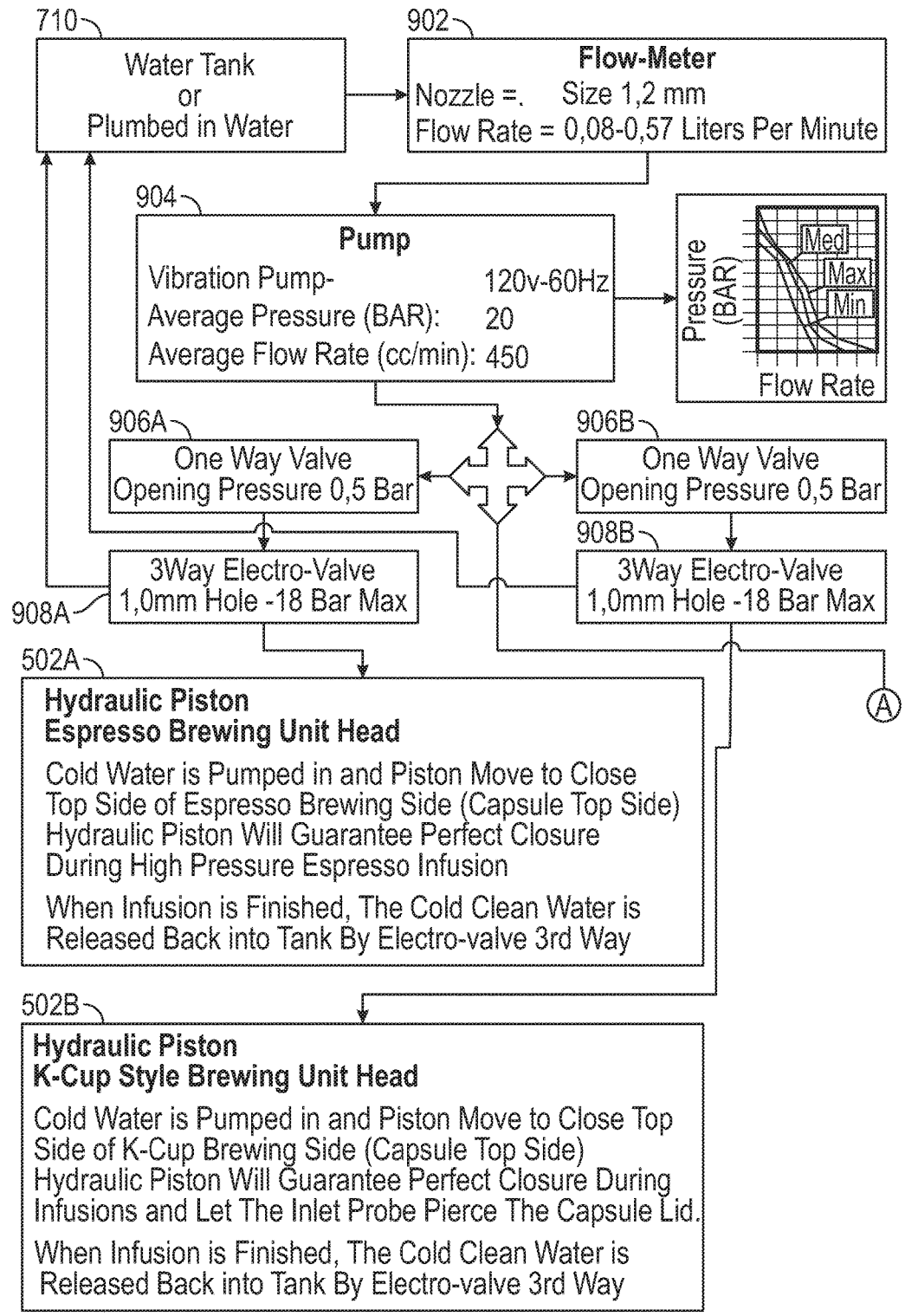
FIG. 9 is a flow diagram of a brewing process in a brewing machine according to an example.
Figure 9:
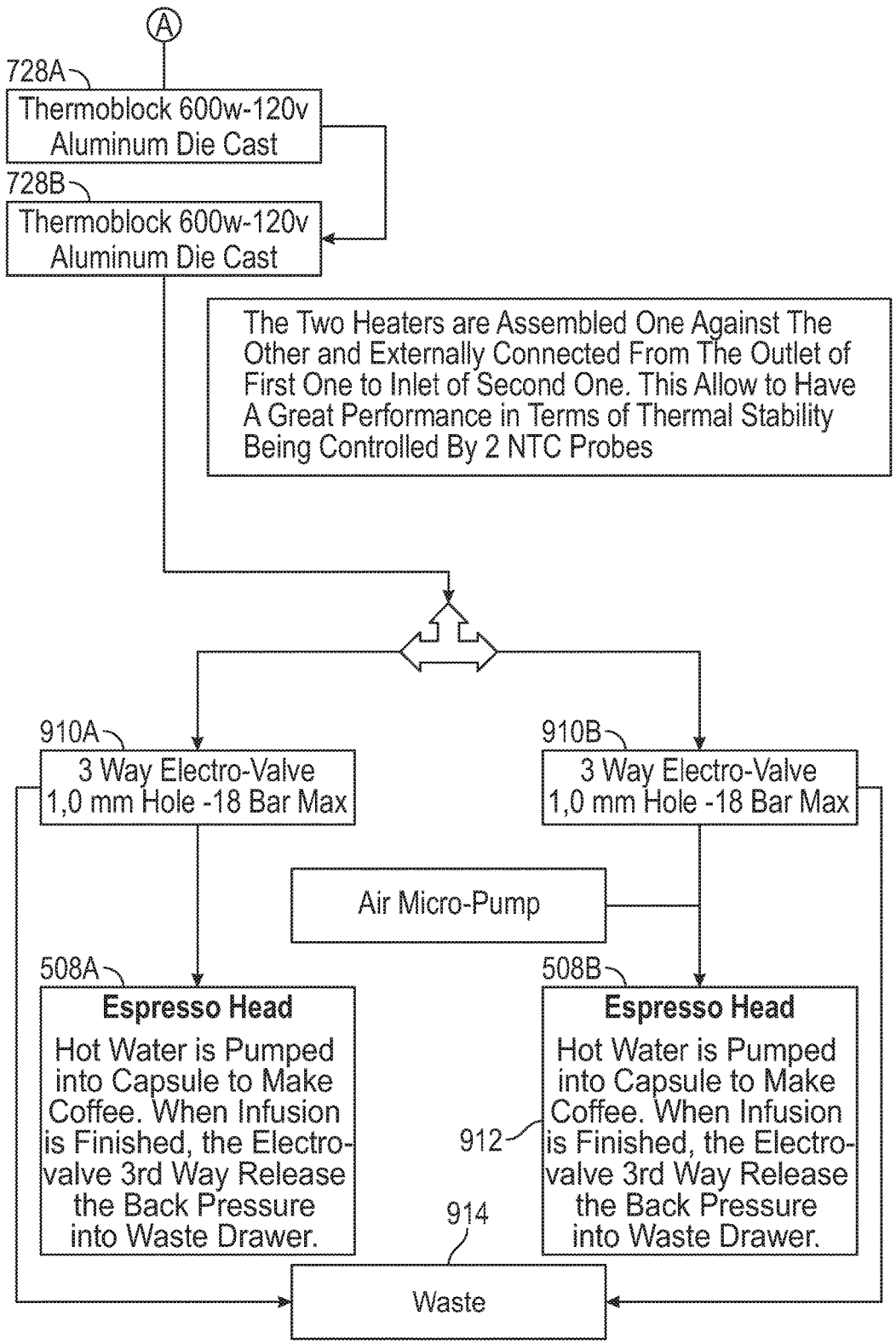

Now with reference to FIG. 9, in accordance with one example, the plumbing system for the brewing machine 100 includes a pump 904 (not shown) delivering water to the two different brewing chambers, or housings 102, of the brewing machine 100. This enables the brewing machine 100 to satisfy these requirements: correct amount of water and flow rate; correct pressure for hydraulic pistons 502; and correct pressure for infusion of cartridge A beverages (espresso style); or correct pressure for infusion of cartridge B beverages (coffee, tea, etc.). In an alternative example, one or more pumps 904 can be employed (e.g. a high-pressure pump for espresso-style beverages, and a low-pressure pump for drip-style beverages).

It will be appreciated that different housings 102 can require different water pressure settings. For example, it has been observed that, for housing 102A (espresso style), at least about 17-18 Bar is needed during infusion into hydraulic piston to ensure good closure and sealing; and up to about 15-16 Bar is needed during infusion inside housing 102A. For housing 102B (K-Cup style), at least about 17-18 Bar is needed during infusion into hydraulic piston to ensure good closure and sealing; however, low pressure during infusion is desired (e.g. from about 0 to 2 Bar).

According to one example, the pump 904 directs (cold) water from the water tank into the piston 502 to close the housing 102 and also directs water to one or more heaters 728 (e.g. thermoblocks) for (hot) water infusion. The pressure of the pump is configured to increase according to the needs of the sensed cartridge (e.g. cartridge A or cartridge B). Once the infusion is completed and the beverage prepared, then all pressure to both the piston 502 and to the heater 728 can be released.

The following description analyzes the steps in both kinds of infusions: cartridge A (espresso style) and cartridge B (K-Cup style): 1) Pump 904 starts; 2) Cold water from the pump 904 enters a one-way valve 906 into an electro-valve 908 controlling (hydraulic) piston 502; 3) Cold water from the electro-valve 908 enters into piston 502 for securing the housing 102; 4) Once piston 502 has completed movement, water pressure increases as the pump 904 continues to work; 5) Pressure increases as water has nowhere to go; 6) Control means 126 open a hot electro-valve 910; and 7) Hot water enters the cartridge for infusion.

The skilled reader will appreciate that the cold water holds the pressure in the piston 502 by keeping open the electro-valve 908, while the one-way valve 906 placed on electro-valve ensures that pressure is not lost (ensuring a secure closure of housing 102). At the same time and for the same reason, hot water from the heater 728 flows into the housing 102 which starts from zero pressure to brew the beverage. Once water enters the cartridge, water pressure starts to rise again. Water pressure for infusion can be determined by the control means 126.

Depending on the characteristics of the ingredients inside the cartridge, giving more or less difficulty for water to pass, the infusion pressure for cartridge A (espresso style) can be variable (e.g. from about 8 to 15 Bar). A similar variability can be observed for cartridge B (K-Cup style) due to the size of the grind or other characteristics when using leaf or other kind of products. In the case of some cartridge formats, such as those marketed under the Vitha™, Rivo™ or Lavazza™ Blue™ brands, for example, infusion pressure can increase first to let the cartridge expand and open. After the cartridge is opened, brewing of the beverage occurs.

It will be appreciated that, during infusion, piston 502 is subject to pressure of up to about 18-19 Bar, enabling the housing 102 to be secured and/or piercing of the cartridge. Once piston 502 is full, water cannot go back so the pressure increased inside the piston 502 will be kept there, ensuring the housing 102 is secured. Once the infusion is completed, the cold clean water can be returned to the water tank 710.

For infusion, however, housing 102 is subject to pressure of up to a totally different value which is near zero for infusion of cartridge B (K-Cup style) and a higher value for infusion of cartridge A (espresso style). As mentioned, the pressure drops to zero when the hot water flow is opened. The water pressure can be increased according to pre-determined settings for the brewing machine 100 or the cartridge, one or more parameters of the sensed cartridge, user input, etc.

The skilled reader will appreciate that the pump 904 can be any pump with variable flow rate specifications fitting the pressure requirements described above for multiple styles of cartridge. As well, though the present specification describes one technique of dynamic movement of water into circuits for securing of the housing 102 and/or infusion, it will be appreciated that different configurations of pumps, valves, heaters, and the like, can be used without departing from the scope of the present specification. The detailed schematics and markings on FIG. 9 are illustrative examples.

It will be appreciated that, according to some examples, the brewing machine 100 provides a variable water pressure dispensing system, in a single, reduced footprint with the capability of accepting and/or processing two or more different beverage cartridge sizes, shapes or geometries having unique brewing requirements or parameters, such as high water pressure, or low water pressure.

The present specification provides a method of brewing a beverage including the steps of providing a brewing machine comprising a plurality of single serve preparation zones, receiving a cartridge, determining a parameter of the received cartridge, selecting one of the plurality of single serve preparation zones according to the sensed parameter of the received cartridge, transferring the received cartridge to the selected single serve preparation zone, and preparing the beverage using the received cartridge in the s single serve elected preparation zone.

Each single serve preparation zone can correspond to a parameter selected from one of: a cartridge geometry and a brewing process. The cartridge can be received in a turn-table rotatable about an axis. The determining step can be performed by a plurality of alignment guides. The cartridge can be transferred by rotation of the turn-table. The single serve preparation zones can include a high water pressure preparation zone for espresso-style beverages, and a low water pressure preparation zone for drip-style beverages.

The method can also include the steps of: after brewing, transferring the spent cartridge to an ejection zone, and ejecting the spent cartridge in the ejection zone. After ejecting, the single serve preparation zone can be flushed with fluid.

After piercing the cartridge to inject a pre-determined amount of fluid, the ejecting can be delayed to permit cartridge ingredients to mix in the fluid for a period of time of five (5) seconds or more to create a concentrate. Air can be inserted into the cartridge to agitate the ingredients prior to ejecting. Water can be injected at a first rate prior to ejecting, and at a second rate during ejecting.

The present specification also provides a brewing machine. The brewing machine includes a machine body. The machine body includes a plurality of single serve preparation zones corresponding to a preparation parameter. The machine body also includes: a cartridge acceptor configured to receive a single serve cartridge, a cartridge sorter configured to determine a parameter of the received cartridge and select one of the plurality of single serve preparation zones according to the determined parameter, a transfer sub-assembly configured to transfer the cartridge to the selected single serve preparation zone, and a fluid dispenser for preparing the beverage using the cartridge in the selected single serve preparation zone.

The fluid dispenser can dispense water under pressure according to the selected single serve preparation zone.

The parameter can include a cartridge geometry. The single serve preparation zones can include a high water pressure preparation zone for espresso-style beverages, and a low water pressure preparation zone for drip-style beverages.

The cartridge transfer sub-assembly can include a turn-table rotatable about an axis. The cartridge acceptor can include a cartridge acceptance chamber defined in the turn-table.

The cartridge sorter can include a plurality of alignment guides that detect a diameter of the cartridge. The cartridge sorter can include a plurality of sensors vertically spaced apart in the cartridge acceptor that detect a height of the cartridge.

The fluid dispenser can include a fluid injection member contained in a first housing member, a fluid ejection member contained in a second housing member. During brewing, the first housing member and the second housing member can secure the cartridge permitting each of the fluid injection member and the fluid ejection member to pierce the cartridge, to inlet fluid through the injection member and to outlet fluid through the ejection member. During brewing, the first housing member can be secured by water pressure and the second housing member can be secured by movement of an articulating arm.

The fluid dispenser can include a plurality of first piercing pins contained in a first housing member and a plurality of second piercing pins contained in a second housing member. During brewing, the first housing member and the second housing member can secure the cartridge permitting each of the plurality of first piercing pins and the plurality of second piercing pins to pierce the cartridge creating openings for fluid to be passed through the openings. During brewing, the first housing member can be secured by water pressure and the second housing member can be secured by movement of an articulating arm.

The brewing machine can also include a tank in fluid connection with a heater for heating the fluid. The heater can be in fluid connection with the fluid dispenser.

The brewing machine can also include a plurality of electro-valves for controlling the fluid connection between the heater and the fluid dispenser.

The brewing machine can also include a pump for providing fluid pressure to secure the first and second housing members, and for dispensing water via the injection needle according to a water pressure parameter determined by the sensed parameter of the received cartridge.

The brewing machine can also include a top surface for storing a plurality of serving cups. The heater can be a boiler can be located proximate the top surface for conducting heat to the top surface and warming the serving cups.

After brewing, the transfer sub-assembly can be configured to transfer the spent cartridge from the selected preparation zone to an ejection zone. Upon carriage of the cartridge to the ejection zone along a cam path, the spent cartridge can be detached through sliding engagement with the cam and released into a collection hopper. Alternatively, the brewing machine can include an exit chute that is positioned at a lower region of the brewing machine permitting the spent cartridge to fall out of the brewing machine While a number of exemplary aspects and examples have been discussed above, those of skill in the art will recognize certain modifications, permutations, additions and sub-combinations thereof.

The invention claimed is:

1. A brewing machine comprising:
   a machine body comprising a plurality of preparation zones wherein each single serve preparation zone corresponds to a preparation parameter;
   a cartridge acceptor configured to receive different types of single serve cartridges singularly insertable from the outside by a user;
   a sensor-based cartridge sorter configured to determine a parameter of the received cartridge and select one of the plurality of single serve preparation zones according to the determined parameter;
   a transfer sub-assembly comprises a turn-table, and the cartridge acceptor comprises a cartridge acceptance chamber defined in the turn-table, that is movably mounted relative to the machine body and is configured to transfer the received cartridge based on movement relative to the machine body about an axis in either a clock-wise direction or in a counter-clockwise direction from a first position to a second position, wherein the first position is for receiving the different types of single serve cartridges, and the second position is the selected single serve preparation zone based on the determined parameter of the received cartridge from the sensor-based cartridge sorter; and
   wherein each single serve preparation zone of the plurality of preparation zones comprises a fluid dispenser for preparing the beverage using the cartridge that is received and transferred by the transfer sub-assembly.

2. The brewing machine of claim 1 wherein the fluid dispenser dispenses water under pressure according to the selected single serve preparation zone.

3. The brewing machine of claim 2 wherein the parameter comprises a cartridge geometry and the single serve preparation zones comprises a high water pressure preparation zone for espresso-style beverages, and a low water pressure preparation zone for drip-style beverages.

4. The brewing machine of claim 1 wherein the sensor-based cartridge sorter comprises a plurality of alignment guides that detect a diameter of the cartridge.

5. The brewing machine of claim 1 wherein the sensor-based cartridge sorter comprises a plurality of sensors vertically spaced apart in the cartridge acceptor that detect a height of the cartridge.

6. The brewing machine of claim 1 wherein the fluid dispenser comprises:
   a fluid injection member contained in a first housing member;
   a fluid ejection member contained in a second housing member; and
   wherein during brewing the first housing member and the second housing member secure the cartridge in a housing permitting each of the fluid injection member and the fluid ejection member to pierce the cartridge, to inlet fluid through the injection member and to outlet fluid through the ejection member.

7. The brewing machine of claim 6 wherein during brewing, the first housing member is secured by water pressure and the second housing member is secured by movement of an articulating arm.

8. The brewing machine of claim 1 wherein the fluid dispenser comprises:
   a plurality of first piercing pins contained in a first housing member;
   a plurality of second piercing pins contained in a second housing member; and
   wherein during brewing the first housing member and the second housing member secure the cartridge permitting each of the plurality of first piercing pins and the plurality of second piercing pins to pierce the cartridge creating openings for fluid to be passed through the openings.

9. The brewing machine of claim 8 wherein during brewing, the first housing member is secured by water pressure and the second housing member is secured by movement of an articulating arm.

10. The brewing machine of claim 6 further comprising:
    a tank in fluid connection with a heater for heating the fluid; and
    the heater in fluid connection with the fluid dispenser.

11. The brewing machine of claim 10 further comprising a plurality of electro-valves for controlling the fluid connection between the heater and the fluid dispenser.

12. The brewing machine of claim 11 further comprising a pump for providing fluid pressure to secure the first and second housing members, and for dispensing water via the injection needle according to a water pressure parameter determined by the sensed parameter of the received cartridge.

13. The brewing machine of claim 10 further comprising a top surface for storing a plurality of serving cups, and wherein the heater is a boiler that is located proximate the top surface for conducting heat to the top surface and warming the serving cups.

14. The brewing machine of claim 1 wherein after brewing, the transfer sub-assembly is configured to transfer the spent cartridge from the selected preparation zone to an ejection zone.

15. The brewing machine of claim 14 further comprising a collection hopper and a cam positioned above the collection hopper, and wherein upon carriage of the cartridge to the ejection zone along a cam path, the spent cartridge is detached through sliding engagement with the cam and released into the collection hopper.

16. The brewing machine of claim 1 further comprising an exit chute that is positioned at a lower region of the brewing machine permitting the spent cartridge to fall out of the brewing machine.

* * * * *